United States Patent
Ahrens et al.

(10) Patent No.: US 6,725,396 B2
(45) Date of Patent: Apr. 20, 2004

(54) IDENTIFYING FIELD REPLACEABLE UNITS RESPONSIBLE FOR FAULTS DETECTED WITH PROCESSOR TIMEOUTS UTILIZING IPL BOOT PROGRESS INDICATOR STATUS

(75) Inventors: George Henry Ahrens, Pflugerville, TX (US); David Russell Armstrong, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 531 days.

(21) Appl. No.: 09/750,482

(22) Filed: Dec. 28, 2000

(65) Prior Publication Data

US 2002/0095625 A1 Jul. 18, 2002

(51) Int. Cl.[7] .............................................. H02H 3/05
(52) U.S. Cl. .................................... 714/10; 713/2
(58) Field of Search ........................... 714/10, 13, 23, 714/36, 51; 713/1, 2; 712/227

(56) References Cited

U.S. PATENT DOCUMENTS

| | | | | |
|---|---|---|---|---|
| 5,245,615 A | * | 9/1993 | Treu | 714/45 |
| 5,530,946 A | * | 6/1996 | Bouvier et al. | 714/23 |
| 5,867,702 A | * | 2/1999 | Lee | 713/1 |
| 6,216,226 B1 | * | 4/2001 | Agha et al. | 713/2 |
| 6,243,823 B1 | * | 6/2001 | Bossen et al. | 714/2 |
| 6,453,429 B1 | * | 9/2002 | Sadana | 714/43 |
| 6,550,019 B1 | * | 4/2003 | Ahrens et al. | 714/10 |
| 6,587,963 B1 | * | 7/2003 | Floyd et al. | 714/25 |

\* cited by examiner

*Primary Examiner*—Dieu-Minh Le
(74) *Attorney, Agent, or Firm*—Mark E. McBurney; Bracewell & Patterson, L.L.P.

(57) ABSTRACT

Described is a method for isolating faults to a correct field replaceable unit (FRU) of a data processing system. When a processor timeout occurs, a fault isolation logic is triggered and checks the boot record to determine if the timeout occurred because of an FRU fault before or after the service processor completed its system initialization. When the timeout occurred because of fault that occurred while the service processor was loading operating system (OS) (e.g., AIX) instructions from the boot device in the input/output (I/O) subsystem, then the FRU callout indicates a boot fault associated with the I/O planar and the CPU (processor) card. When the FRU fault occurred prior to fetching the OS instructions from the boot device or after the service processor completed its system initialization procedures, then the FRU callout is attributed to the processor card and backplane. Attributing boot error faults to incorrect FRUs is therefore substantially eliminated.

19 Claims, 3 Drawing Sheets

IDENTIFYING FIELD REPLACEABLE UNITS RESPONSIBLE FOR FAULTS DETECTED WITH PROCESSOR TIMEOUTS UTILIZING IPL BOOT PROGRESS INDICATOR STATUS

BACKGROUND OF THE INVENTION

1. Technical Field

The present invention relates in general to data processing systems and, in particular, to a method for identifying faults associated with field replaceable units (FRU) of a data processing system. Still more particularly, the present invention relates to a method for correctly identifying whether a fault identified by a processor timeout is isolated to the correct FRU utilizing Initial Program Load (IPL) boot progress status indicator.

2. Description of the Related Art

A typical data processing system consists of a central processing unit (CPU), memory components, and a number of device controllers that are typically connected through a system of buses that provides access to shared memory. In order to operate, the data processing system requires electrical power and software components that control the interactions between the various hardware components during operation.

For a data processing system to start running, for instance upon power-up or reboot, an initializing program is necessary. The initializing program, or bootstrap program, preferably initializes (i.e., activates) all components (hardware, firmware and software) of the data processing system, from CPU registers to device controllers and memory contents. At startup each of the various hardware components of the data processing system first performs an internal reset procedure to obtain a known stable state. Once these hardware reset procedures have completed successfully, each component of the data processing system performs a Logical Built-in Self-Test (LBIST) or an Array Built-in Self-Test (ABIST). A service processor then performs a LBIST or ABIST signature verification against a known signature value. Once the verification is complete, the service processor initializes each component of the data processing system.

Next, firmware is executed to complete the initialization process. In many data processing systems, this firmware includes Power-On-Self-Test (POST) software that surveys and performs sanity checks on the system hardware, a Basic Input Output System (BIOS) that interfaces processor(s) to key peripherals such as a keyboard and display monitor, and an operating system loader (bootstrap) program that launches execution of a selected operating system. These basic firmware procedures, which are often bundled together in a startup flash memory, enable the data processing system to obtain an operating state at which the data processing system is available to execute software applications.

During execution, the service processor and firmware typically interact with one specific component within the data processing system at a time. When a system "hang" occurs during startup, there is a high probability that the cause of the system "hang" is related to the component that the firmware or the service processor is accessing at that time. Without any additional knowledge, however, the identification of the source of error is typically accomplished by replacing each adapter card in the data processing system to determine whether or not the adapter card caused the system "hang."

State-of-the art data processing systems utilizing specialized processor chips generally include a hang detection mechanism for the firmware-encountered hangs, described above. For example, the Power PC 630 processors (i.e., data processing systems with 630 processor chips) have a built in hang detection mechanism, which is triggered when the 630 processor chip stops executing instructions. Unfortunately, in some of these instances, however, false FRU faults are indicated when the condition that actually causes the timeout/fault occurs at boot time and the processor card is not the cause of the error. In these cases, the 630 watchdog times out because the input/output (I/O) subsystem is not able to provide the boot instructions for any of a number of reasons, causing the 630 processor to operate in a loop waiting for instructions to execute. Presently, there is no way for the hang detection mechanism to isolate which FRU(s) are responsible for system hangs during processor operation.

The present invention recognizes that it would therefore be desirable to provide a method, system, and program product that isolates faults identified during boot-up and/or operation of a data processing system to a correct field replaceable unit (FRU). The invention further realizes that it would be time saving if the method, system, and program product utilized the boot progress indicators of the Initial Program Loader (IPL) to complete the fault isolation procedure.

SUMMARY OF THE INVENTION

Described is a method, system, and program product for isolating faults to a correct field replaceable unit (FRU) of a data processing system utilizing the boot progress indicators of the initial program loader (IPL). A fault isolation logic is associated with the hang detection mechanism of the data processing system's processor. The hang detection mechanism monitors the processor for a timeout, i.e., when the processor "hangs." When a timeout occurs, the fault isolation logic is triggered and checks the boot record to determine if the timeout occurred because of an FRU fault before or after the service processor completed system initialization. The result of the check is outputted to a user/administrator. When the timeout condition occurred because of an error while the service processor was loading operating system (OS) (e.g., AIX) instructions from the boot device in the input/output (I/O) subsystem, then the FRU fault is indicated to be a boot fault associated with the I/O planar and the processor card. When the FRU fault occurred prior to fetching the OS instructions from the boot device and transferring control to system firmware or after the service processor completed its system initialization procedures, (i.e., when the system firmware began initializing the hardware and the processor began operating), then the fault is attributed to the processor card and backplane. Attributing boot error faults to incorrect FRUs is therefore substantially eliminated.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
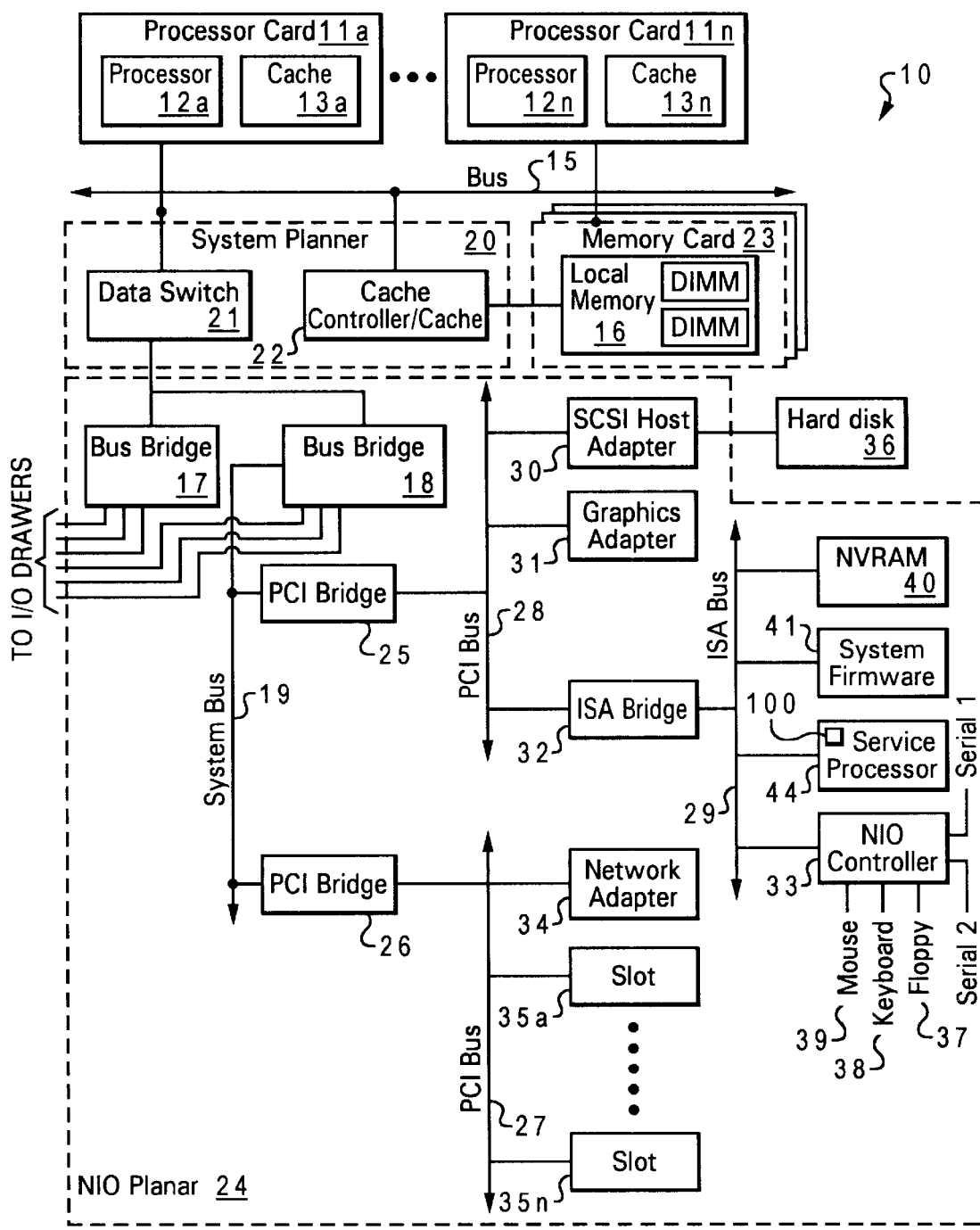
FIG. 1 is a block diagram of an illustrative embodiment of a data processing system with which the present invention may advantageously be utilized.

Referring now to the drawings and in particular to FIG. 1, there is depicted a block diagram of an illustrative embodiment of a data processing system with which the present invention may advantageously be utilized. As shown, data processing system 10 includes processor cards 11a–11n. Each of processor cards 11a–11n includes a processor and a cache memory. For example, processor card 11a contains processor 12a and cache memory 13a, and processor card 11n contains processor 12n and cache memory 13n.

Processor cards 11a–11n are connected to main bus 15. Main bus 15 supports a system planar 20 that contains data switch 21 and memory controller/cache 22. Memory controller/cache 22 supports memory card 23 that includes local memory 16 having two dual in-line memory modules (DIMMs). The system bus 19 and processor cards 11a–11n are also contained on system planar 20.

Data switch 21 connects to bus bridge 17 and bus bridge 18 located within a native I/O (NIO) planar 24. As shown, bus bridge 18 connects to peripheral components interconnect (PCI) bridges 25 and 26 via system bus 19. PCI bridge 25 connects to a variety of I/O devices via PCI bus 28. As shown, hard disk 36 may be connected to PCI bus 28 via a small computer system interface (SCSI) host adapter 30. A graphics adapter 31 may be directly or indirectly connected to PCI bus 28. PCI bridge 26 provides connections for external data streams through network adapter 34 and adapter card slots 35a–35n via PCI bus 27.

An industry standard architecture (ISA) bus 29 connects to PCI bus 28 via ISA bridge 32. ISA bridge 32 provides interconnection capabilities through NIO controller 33 having serial connections 1 and 2. A floppy drive connection 37, keyboard connection 38, and mouse connection 39 are provided by NIO controller 33 to allow data processing system 10 to accept data input from a user via a corresponding input device. In addition, non-volatile RAM (NVRAM) 40 provides a non-volatile memory for preserving certain types of data from system disruptions or system failures, such as power supply problems. A system firmware 41 is also connected to ISA bus 29 for implementing the initial Basic Input/Output System (BIOS) functions. A service processor 44 connects to ISA bus 29 to provide functionality for system diagnostics or system servicing.

The operating system (OS) is stored on hard disk 36, which may also provide storage for additional application software for execution by data processing system. NVRAM 40 is used to store system variables and error information for FRU isolation. In the preferred embodiment, NVRAM 40 preserves boot indicators as described below. During system startup, the bootstrap program loads the operating system and initiates execution of the operating system. To load the operating system, the bootstrap program first locates an operating system kernel type from hard disk 36, loads the OS into memory and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The present invention may be executed in a variety of data processing systems utilizing a number of different hardware configurations and software such as bootstrap programs and operating systems. The data processing system 10 may be, for example, a stand-alone system or part of a network such as a local-area network (LAN) or a wide-area network (WAN). Specifically, the invention is implemented utilizing a field replaceable unit (FRU) fault isolation logic 100 (which may be implemented as a firmware algorithm) associated with the processor timeout mechanism of the Power PC 630 processor chip. The FRU fault isolation logic 100 is located within the service processor 44 of FIG. 1.

The preferred embodiment of the present invention, as described below, is implemented within a data processing system 10 in which at least one of processor 12a–12n is a Power PC 630 processor manufactured by International Business Machines Corporation of Armonk, N.Y. The invention, however, may extend to other processor types and the references to the 630 processor are not intended to be limiting on the invention. The 630 processor chip has a built in hang detection mechanism, which triggers when the 630 processor is not executing instructions correctly and enters into a hang condition (i.e., a preselected timeout period has expired).

Figure 2:
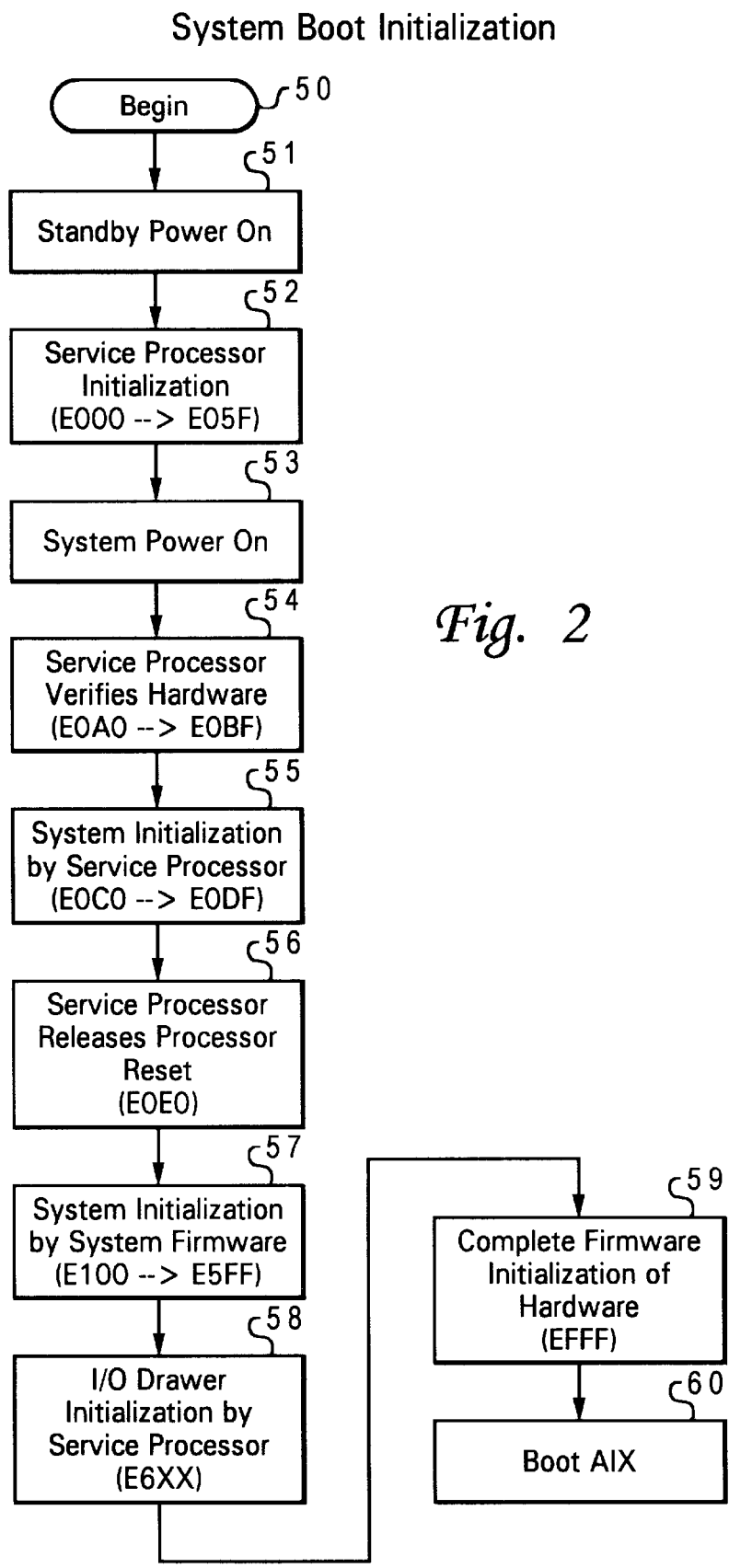
FIG. 2 is a high-level logic flow diagram of a method for performing system boot/startup in the data processing system of FIG. 1, in accordance with a preferred embodiment of the present invention.

Referring now to FIG. 2, there is depicted a high-level logic flow diagram of a method for performing system startup in data processing system 10, in accordance with a preferred embodiment of the present invention. For ease of illustration, the system startup process has been illustrated in a sequential manner; however, as will be apparent to a person of ordinary skill in the art from the following description, many of the illustrated steps may be performed in a different order than those shown in FIG. 2 or may be performed concurrently.

The process begins at block 50 and standby power for the system is turned on or the system re-booted, as shown in block 51. Then, the initialization of service processor 44 begins, as depicted in block 52. This initialization may entail service processor 44 performing certain low level hardware tests, and preferably includes service processor 44 executing firmware stored in a service processor memory that completes the check of service processor 44. Then, power for the system is turned on, as illustrated in block 53. Next, service processor 44 verifies hardware, as shown in block 54. System initialization is then performed by service processor 44, as depicted in block 55.

Next service processor 44 releases processors reset, as shown in block 56. At this point of the initialization process, the responsibility for performing the remainder of the initialization procedures is transferred from service processor 44 to system firmware 41 (i.e., the E0E0 checkpoint, as described further below). Accordingly, as depicted at block 57, processors, such as processors 12a–12n, begin to execute system firmware 41 in order to perform the remainder of the initialization procedures, which include a determination of the present hardware configuration of data processing system 10. The hardware configuration of data processing system 10 is defined to include the components present in data processing system 10, the interconnections between the components, and the accessibility of the components to the operating system. The process of transferring control between the initialization firmware executed by service processor 44 and system firmware 41 executed by the processors includes the initialization firmware passing to system firmware 41 the power information (or a pointer to the power information) indicating the number of I/O drawers detected by the power control firmware.

Following, system firmware 41 executed by processors 12a–12n commences the remainder of the initialization procedures, including initializing I/O drawers, as depicted at block 58. In addition to checking if I/O drawers are properly installed, system firmware 41 further checks to determine if communication can be established with each installed I/O device, such as a LAN adapter, a SCSI controller, etc. After the completion of firmware initialization, as shown in block 59, system firmware 41 then boots the operating system, such as Advanced Interactive executive (AIX) available from International Business Machines Corporation of Armonk, N.Y., from a storage device, such as hard disk 36, as depicted in block 60. Thereafter, data processing system 10 continues operation under the control of the operating system.

The present invention provides an FRU fault isolation logic which is triggered by the built-in hang detection mechanism of the 630 processor. The hang detection mechanism identifies when the 630 processor is not executing instructions correctly and enters into a hang condition. In the preferred embodiment, the hang condition is identified whenever a preselected timeout period for completion of a processor operation expires.

With prior error analysis algorithms, the 630 watchdog timeout bit is monitored, and the processor FRU (i.e., the CPU or processor card) is automatically assumed to be the most probable cause of the fault. In some of these instances, however, false FRU faults are indicated when the condition that actually causes the timeout/fault occurs at boot time, and the processor card is not the cause of the error. In these cases, the 630 processor timed out because the input/output (I/O) subsystem is not able to provide the boot instructions for any of a number of reasons, causing the 630 processor to operate in a loop waiting for instructions to execute. The actual value of the timeout period is a design parameter of the processor. Once the timeout occurs, the associated error indicators are set. A false FRU fault analysis may result in a re-ordering of the FRUs, which ultimately does not address the source of the problem. The report is referred to herein as a call out and specifically an FRU call out, which provides a reference code and location code for the associated FRUs in a particular order corresponding to which unit most likely failed or caused the timeout.

The manner of logging and processing a detected error may depend on the type of error and when the error occurs, e.g., whether the error occurs during system initialization procedures. If an error is detected during system initialization, all devices, components or services within data processing system 10 may not have been initialized. However, in some instances, the user is unaware of boot-time errors, particularly when those errors are not fatal to the boot-up procedure, and the processor begins executing instructions. Thus, the processor may be completely initialized and operational despite these errors. Note, while some errors will not prevent the system from booting successfully, all errors that result in deallocated resources are reported to users after the system loads successfully.

With the 630 processor utilized in the preferred embodiment, these errors along with other errors that occur during later processing may cause a timeout to occur when the 630 processor hangs. These errors include, for example, boot-time errors, severe intermittent problems, and adverse environmental computing conditions, such as conditional bandwidth bottlenecks.

The preferred embodiment of the invention substantially eliminates the above assumptions that leads to falsely identifying the processor FRU as being responsible for the occurrence of the faults. The invention utilizes the boot progress indicators stored in NVRAM to determine the last step in the IPL sequence to successfully execute and only re-orders the FRUs in the case of an appropriate 630 processor timeout. In the preferred embodiment, once an error is identified, the fault isolation logic is triggered to begin determining the FRU responsible for the error, according to the process described below with reference to FIG. 3.

During the boot initialization process, the service processor stores the boot progress indicators in a specific NVRAM location which is kept current with each step of the initialization process. Additional error registers to help with isolation on a watchdog timeout can not be scanned into NVRAM because the error registers used for analysis of a failure are scanned and stored in NVRAM, and the NVRAM definition is locked. The invention however recognizes that the boot progress indicators are stored in a separate NVRAM partition, and utilizes these indicators to determine at which point in the IPL sequence, if any, the boot failed. When a fault occurs, the error isolation procedures of the fault isolation logic analyze the fault by first interrogating chip error registers such as those in the processor chip for whether an error bit is set. If there is an error bit set in the processor chip, the fault isolation logic determines if the bit represents a watchdog processor timeout. If so, the error isolation algorithm will then go to the specific NVRAM location and interrogate the last boot progress indicator to determine the value. If the value is equal to a predetermined threshold (E0E0) representing the attempt to transfer of control from service processor to system firmware, then the FRU callouts are modified appropriately. Otherwise, the processor and backplane are indicated as the most likely fault.

Figure 3:
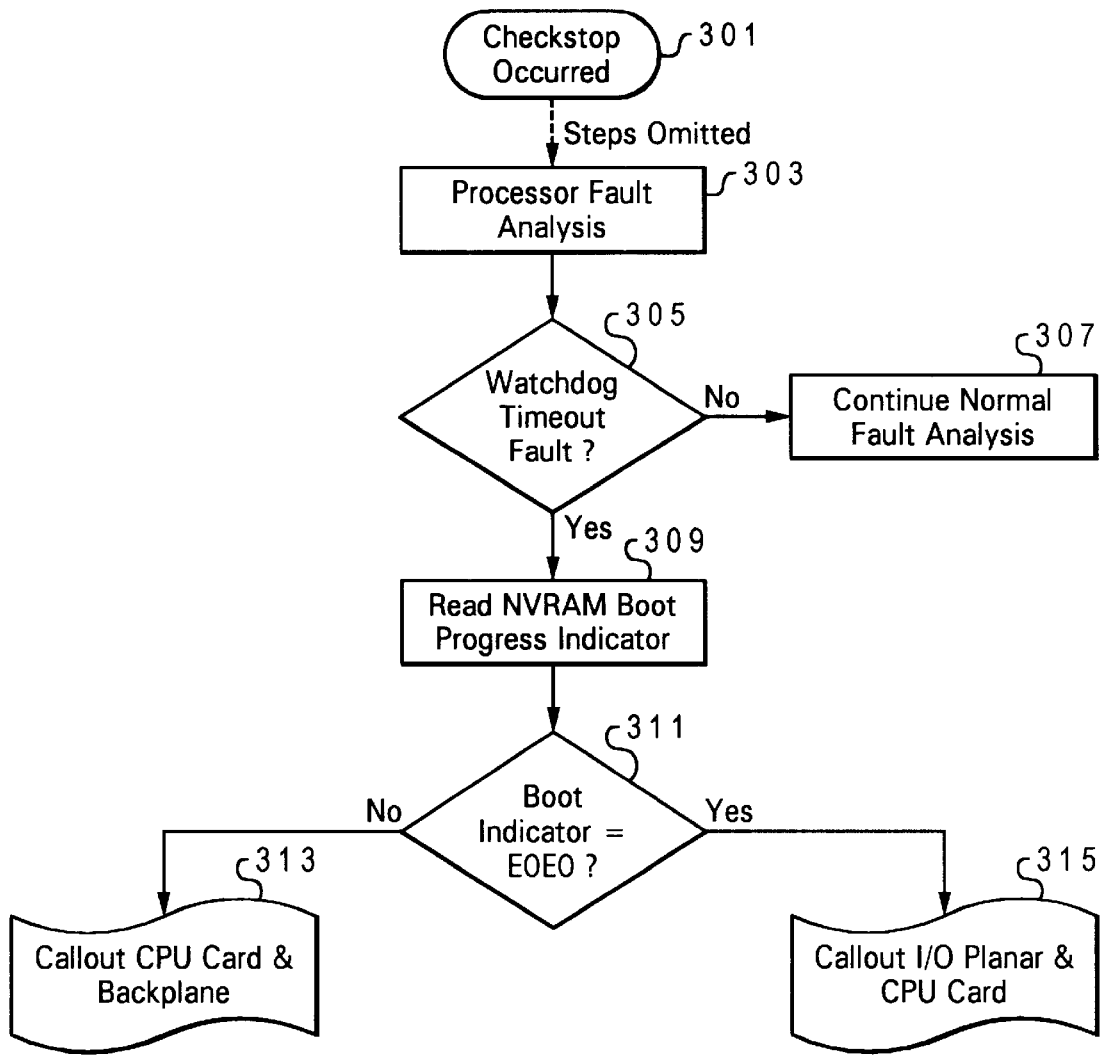
FIG. 3 is a high-level logic flow diagram of a method for implementing FRU fault isolation in accordance with a preferred embodiment of the present invention.

Referring now to FIG. 3, the process of fault isolation begins when a checkstop occurs during processing as shown in block 301. A processor fault analysis is initiated at block 303. The fault isolation logic is initiated and checks at block 305 whether the checkstop occurred because of a 630 processor watchdog timeout error (indicated by the error bit set in the processor chip). If the error is not because of a 630 processor watchdog timeout error, then a normal fault analysis is continued as illustrated in block 307. When the error is because of the 630 processor watchdog timeout error, the fault isolation logic reads the NVRAM boot progress indicator as shown at block 309.

A determination is made at block 311 whether the boot progress indicator state equals E0E0, which indicates that the firmware was requested or attempted to take over system initialization from the service processor (i.e., the service processor releases processor reset). Specifically, the fault isolation logic checks the boot progress indicator to determine how far the boot progressed. If the boot has not yet reached or has progressed beyond the E0E0 checkpoint (where the processors are released to begin executing IPL instructions fetched from the boot device), then, as shown in block 313, the CPU card and planar are identified as the failed FRUs. Otherwise, the boot hung at E0E0, while attempting to load system firmware, and the fault isolation logic modifies the call out to identify the I/O planar and the CPU card as the primary failed FRUs as indicated in block 315. The identification of the failed FRUs may be outputted to the user in any of the output mechanisms available to data processing system 10 as described above.

As has been described, the present invention provides an improved method and system for substantially eliminating FRU fault indications that are a result of a boot error and not a FRU run-time error. The invention provides a mechanism to identify the probable source of error that causes a processor hang during operation. Once the isolation of the correct FRU is completed, other steps may be implemented to correct the error conditions. Implementation of the features of the invention provides significantly reduced response or repair time and costs when the non-CPU FRU related types of failures are encountered and results in increased system availability and customer satisfaction.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable media such as floppy disks or CD ROMs and transmission media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method of reducing incorrect identification of field replaceable units (FRUs) as a source of a fault that causes a processor of a data processing system to hang, said method comprising:

identifying an occurrence of a time-out during operation of said processor;

dynamically determining whether an error occurred at a pre-determined checkpoint during boot-up of said data processing system, which may have caused said time-out;

responsive to said determining step, selecting a normal call out order of FRUs responsible for said time-out only when said error did not occur at said predetermined checkpoint; and initiating re-ordering of said call out of said FRUs only when an initial program load (IPL) procedure at said pre-determined checkpoint is a last attempted mocedure in the boot process.

2. The method of claim 1, wherein said identifying step further includes:

dynamically monitoring an error bit of said processor, wherein said error bit is set when a timeout occurs; and responsive to said error bit being set, automatically initiating a fault isolation logic to complete said determining step.

3. The method of claim 1, further comprising:

accessing a boot progress indicator in a non-volatile random access memory (NVRAM) of said data processing system; and evaluating (IPL) procedure at said predetermined checkpoint.

4. The method of claim 3, wherein said predetermined checkpoint identifies an IPL operation at which a service processor transfers control to system firmware, and said processor is released to begin executing IPL instructions fetched from a boot device of said data processing system, and said predetermined checkpoint has an affiliated boot progress indicator value representing attempted transfer of control to system firmware.

5. The method of claim 4, wherein, when a last boot progress indicator value is equal to said affiliated boot progress indicator value, said indicating step comprises modifying an FRU call out as an I/O planar and CPU card.

6. The method of claim 5, wherein, when a last boot progress indicator value is not equal to said affiliated boot progress indicator value, said indicating comprises identifying a call out to provide said CPU card and backplane subsystems of the data processing system.

7. A computer program product comprising:

a computer readable medium; and program instructions on said computer readable medium for reducing incorrect identification of field replaceable units (FRUs) as a source of a fault that causes a processor of a data processing system to hang, by:

identifying an occurrence of a time-out during operation of said processor;

dynamically determining whether an error occurred at a pre-determined checkpoint during boot-up of said data processing system, which may have caused said time-out;

responsive to said determining step, selecting a normal call out order of FRUs responsible for said time-out only when said error did not occur at said predetermined checkpoint; and initiating re-ordering of said call out of said FRUs only when an initial program load (IPL) procedure at said pre-determined checkpoint is a last attempted procedure in the boot process.

8. The computer program product of claim 7, wherein said identifying program instructions further includes instructions for:

dynamically monitoring an error bit of said processor, wherein said error bit is set when a timeout occurs; and responsive to said error bit being set, automatically initiating a fault isolation logic to complete said determining step.

9. The computer program product of claim 8, further comprising program instructions for:

accessing a boot progress indicator in a non-volatile random access memory of said data processing system; and evaluating (IPL) procedure at said predetermined checkpoint.

10. The computer program product of claim 9, wherein said predetermined checkpoint identifies an IPL operation at which a service processor transfers control to system firmware, and said processor is released to begin executing IPL instructions fetched from a boot device of said data processing system, and said predetermined checkpoint has an affiliated boot progress indicator value representing attempted transfer of control to system firmware.

11. The computer program product of claim 10, wherein when a last boot progress indicator value is equal to said affiliated boot progress indicator value, said indicating program instructions comprises instructions for modifying an FRU call out as an I/O planar and CPU card.

12. The computer program product of claim 11, wherein when a last boot progress indicator value is not equal to said affiliated boot progress indicator value, said indicating program instructions include instructions for identifying a call out to provide said CPU card and backplane subsystems of the data processing system.

13. A data processing system comprising:

a processor that includes field replaceable units (FRUs);

a non volatile random access memory (NVRAM);

an operating system;

a boot-up application that includes an initial program load sequence that records and stores boot progress indicators in said NVRAM during boot-up;

a fault isolation mechanism that reduces incorrect identification of field replaceable units as a source of a fault that causes a processor of a data processing system to hang; and logic for initiating re-ordering of a call out of said FRUs only when an initial program load (IPL) procedure at said pre-determined checkpoint is a last attempted procedure in the boot process.

14. The data processing system of claim 13, wherein said fault isolation mechanism comprises logic for:

identifying an occurrence of a time-out during operation of said processor;

dynamically determining whether an error occurred at a pre-determined checkpoint during boot-up of said data processing system, which may have caused said time-out; and responsive to said determining step, selecting a normal call out order of FRUs responsible for said time-out only when said error did not occur at said predetermined checkpoint.

15. The data processing system of claim 14, wherein said identifying logic further:

dynamically monitoring an error bit of said processor, wherein said error bit is set when a timeout occurs; and responsive to said error bit being set, automatically initiating a fault isolation logic to complete said determining step.

16. The data processing system of claim 15, wherein said fault isolation mechanism further comprises logic for:

accessing a boot progress indicator in a non-volatile random access memory of said data processing system; and evaluating initial program load (IPL) procedure at said predetermined checkpoint.

17. The data processing system of claim 16, wherein said predetermined checkpoint identifies an IPL operation at which a service processor transfers control to system firmware, and said processor is released to begin executing IPL instructions fetched from a boot device of said data processing system, and said predetermined checkpoint has an affiliated boot progress indicator value representing attempted transfer of control to system firmware.

18. The data processing system of claim 17, wherein, when a last boot progress indicator value is equal to said affiliated boot progress indicator value, said logic modifies an FRU call out as an I/O planar and CPU card.

19. The data processing system of claim 18, wherein, when a last boot progress indicator value is not equal to said affiliated boot progress indicator value, said logic identifies a call out to provide said CPU card and backplane subsystems of the data processing system.

* * * * *